A. BURROWS.
WALL MOLDING HANGER FOR BIRD CAGES, &c.
APPLICATION FILED AUG. 26, 1919.
1,347,009.  Patented July 20, 1920.
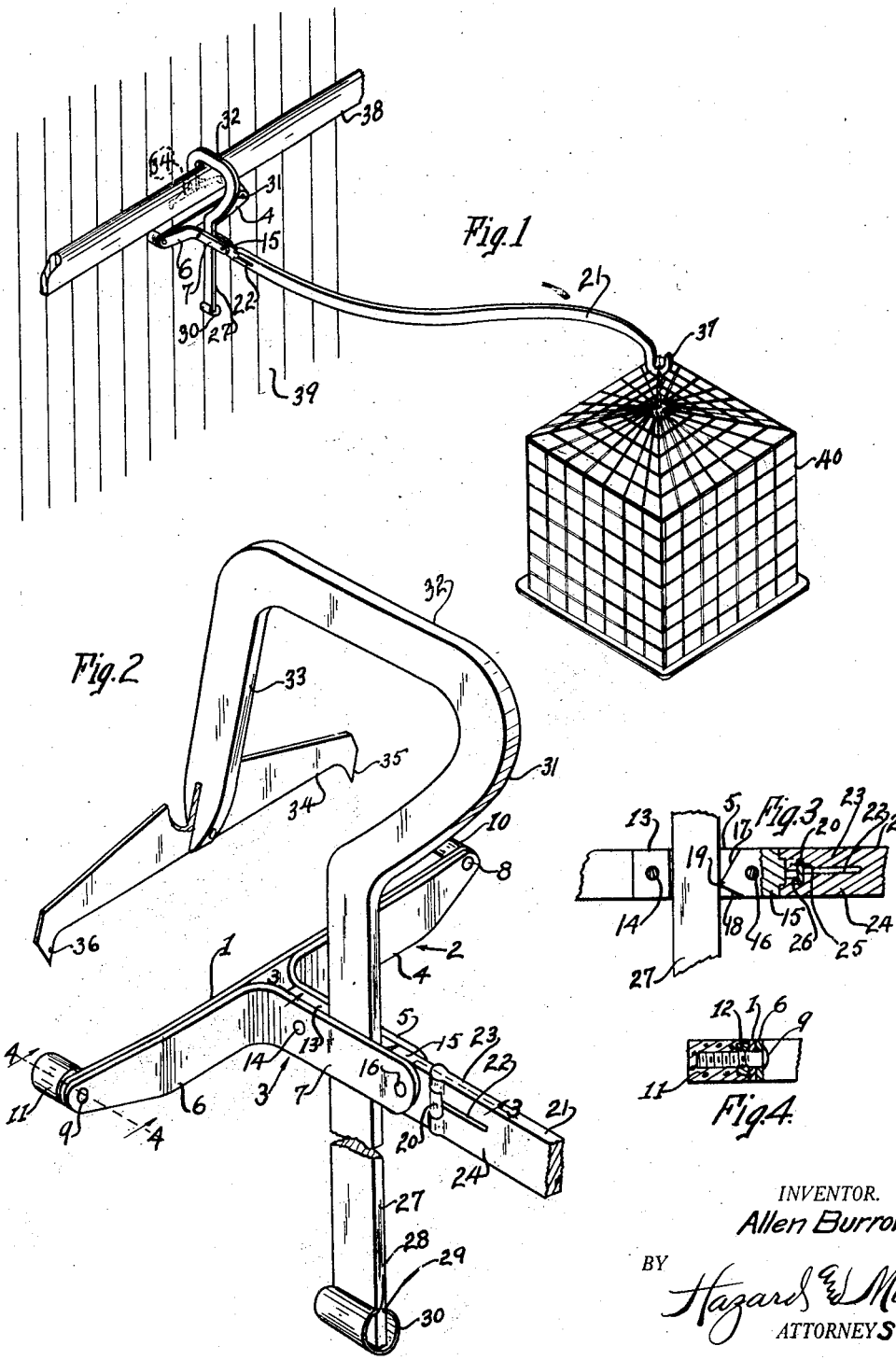
INVENTOR.
Allen Burrows
BY
Hazard & Miller
ATTORNEYS

UNITED STATES PATENT OFFICE.

ALLEN BURROWS, OF LOS ANGELES, CALIFORNIA.

WALL-MOLDING HANGER FOR BIRD-CAGES, &c.

1,347,009.

Specification of Letters Patent. Patented July 20, 1920.

Application filed August 26, 1919. Serial No. 319,989.

*To all whom it may concern:*

Be it known that I, ALLEN BURROWS, a citizen of the United States, residing at Los Angeles, in the county of Los Angeles and State of California, have invented new and useful Improvements in Wall-Molding Hangers for Bird-Cages, &c., of which the following is a specification.

My object is to make a wall molding hanger for bird cages and the like, and my invention consists of the novel features herein shown, described and claimed.

Figure 1 is a perspective, showing a wall molding hanger for bird cages and the like embodying the principles of my invention.

Fig. 2 is an enlarged detail perspective of the hanger, parts being broken away and shown in section.

Fig. 3 is a fragmentary vertical sectional detail on the line 3—3 of Fig. 2.

Fig. 4 is a sectional detail on the line 4—4 of Fig. 2.

The brace 1 is a flat straight bar. The brackets 2 and 3 are similar material. The bracket 2 has a portion 4 fitting against the front face of one end of the brace 1 and a portion 5 extending forwardly at right angles from the inner end of the portion 4. The bracket 3 has a portion 6 fitting against the other end of the brace 1 and a portion 7 extending forwardly at right angles from the inner end of the portion 6. Pins 8 and 9 are fixed through the outer end of the brackets 2 and 3 and through the brace 1. Referring to Fig. 4 the pin 9 is a screw and the screw is inserted through the portion 6 and through the brace 1 from the front, a nut 12 is placed upon the screw and the rubber cushion 11 is placed upon the rear end of the screw against the nut. The pin 8 and cushion 10 are similarly constructed. Referring to Fig. 3 the spacing block 13 is placed between the portions 5 and 7 and secured in place by a rivet 14. The hinge member 15 is placed between the forward ends of the portions 5 and 7 and secured loosely in place by a rivet 16.

The rear faces, 17 and 18 are inclined to produce a gripping point 19. The forward end has a vertical bearing 20 extending forwardly from the body of the hinge member 15.

The supporting arm 21 has a horizontal slit 22 in its rear end, thus forming arms 23 and 24 and pintles 25 and 26 extending toward each other, at the rear ends of the arms. In connecting the supporting arm 21 to the hinge member 15 the arms 23 and 24 are bent apart straddle the vertical bearing 20 and then the arms 23 and 24 are bent together to force the pintles 25 and 26 into the bearing 20.

An adjusting bar 27 fits between the portions 5 and 7 and between the block 13 and the gripping cam 19 so that when the forward end of the supporting arm 21 is raised, the adjusting bar 27 is released and moved up or down, and when the bar 27 is released the point 19 will grip the bar 27 and hold the bar 27 in its adjusted position. The lower end of the bar 27 has horizontal slots 28 and 29 and a clip 30 has ends to slide into the slots 28 and 29. The clip 30 is circular in cross section or end elevation and longitudinally slotted and slides into place to hold the bar 27, from being moved.

An arm 31 extends upwardly and forwardly from the upper of the end bar 27 and has a portion 32 extending horizontally backwardly and a portion 33 extending downwardly. The gripping bar 34 is fastened to the lower end of the portion 33 substantially parallel with the brace 1 and it has teeth 35 and 36 extending downwardly from its ends. The bird cage hook 37 is formed upon the forward end of the supporting bar 21.

In the practical operation the teeth 35 and 36 are inserted over the molding 38, the supporting bar 21 is elevated and the brace 1 adjusted up or down with the bar 27 and the supporting bar released and the cushions 10 and 11 placed against the wall 39 and the bird cage 40 is applied to the hook 37.

The bird cage may be swung to any position laterally upon the vertical bearing 20 and the teeth 35 and 36 may be moved along the molding 38 and the cushions 10 and 11 may be adjusted up and down within the limits of the bar 27.

Various changes may be made without departing from the spirit of my invention as claimed.

I claim:

1. A wall molding hanger for bird cages or the like comprising a gripping bar, teeth extending downwardly from the ends of the gripping bar, an arm extending upwardly outwardly downwardly and inwardly from the gripping bar, an adjusting bar extending straight down from the opposite end of the arm from the gripping bar, a brace, brackets extending forwardly from the brace, a spacing block between the brackets against which the adjusting bar fits, a hinge member pivotally connected to the brackets in front of the adjusting bars a vertical bearing extending forwardly from the hinge member, a supporting bar connected to the vertical bearing to swing laterally, and a cam upon the hinge member to engage the adjusting bar.

2. A wall molding hanger for bird cages and the like comprising a gripping bar adapted to engage a wall molding, an arm extending upwardly and outwardly from the gripping bar, an adjusting bar extending downwardly from the forward end of the arm, a brace, cushions upon the ends of the brace and adapted to engage a wall, means for adjusting and connecting the bar to the brace, and a supporting bar extending outwardly from the adjusting means.

3. A wall molding hanger including a gripping bar adapted to fit between the wall and a molding secured to said wall, teeth on the ends of said bar for engaging said molding, an arm secured to said bar midway between its ends, extending upwardly, outwardly, downwardly and inwardly, an adjusting bar extending straight down from the lower end of said arm, a brace formed with a member extending parallel to the wall and with two members extending forwardly from said first brace member midway of its ends, between which forwardly extending members said adjusting bar depends, means on said brace member for engaging the wall, a block between said forwardly extending members which the rear edge of said adjusting bar engages, a gripping point in the forward end of said forwardly extending members for engaging the front edge of said adjusting bar and inclined faces extending forwardly and respectively upwardly and downwardly from said gripping point, and a supporting bar mounted on the forward end of said forwardly extending brace members.

In testimony whereof I have signed my name to this specification.

ALLEN BURROWS.